H. REYNOLDS.
Revolver.
No. 2,234. Reissued May 1, 1866.
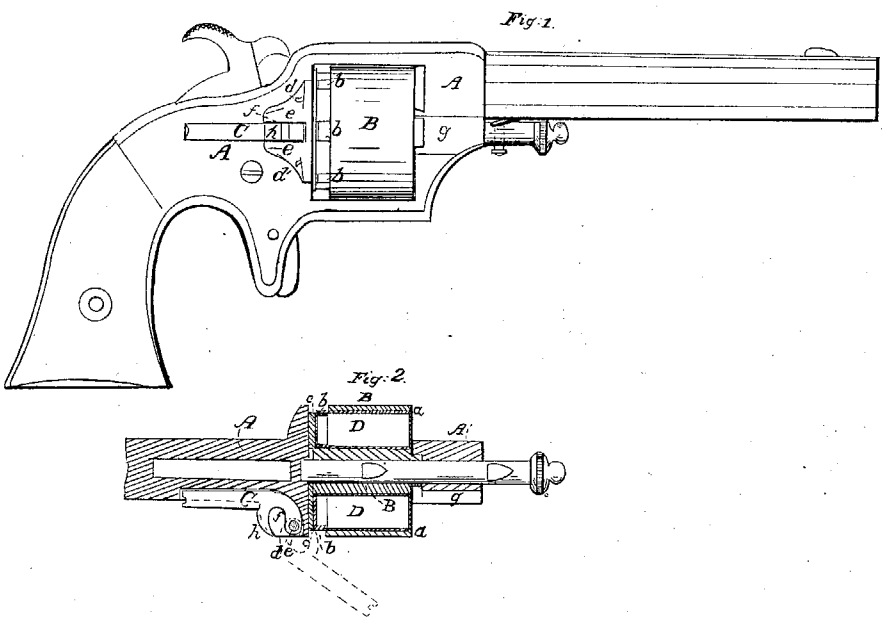
Witnesses.
A. F. Schlegel
S. F. Cohrn
Inventor.
H. Reynolds
Jr. Brown Coombs & Co
Attorneys
N. PETERS, PHOTO-LITHOGRAPHER, WASHINGTON, D. C.

UNITED STATES PATENT OFFICE.

HENRY REYNOLDS, OF SPRINGFIELD, MASSACHUSETTS.

IMPROVEMENT IN CARTRIDGE-EXTRACTORS FOR FIRE-ARMS.

Specification forming part of Letters Patent No. 45,176, dated November 22, 1864; Reissue No. 2,234, dated May 1, 1866.

*To all whom it may concern:*

Be it known that I, HENRY REYNOLDS, of Springfield, in the county of Hampden and State of Massachusetts, have invented a new and Improved Cartridge-Shell Ejector for Fire-Arms; and I do hereby declare that the following is a full, clear, and exact description of the same, reference being had to the accompanying drawings, forming a part of this specification, in which—

Figure 1 is a side view of a revolving pistol having my invention applied. Fig. 2 is a horizontal section of the same.

Similar letters of reference indicate corresponding parts in both figures.

My invention is designed more especially for application to revolvers which are loaded in front of the chambers with metallic cartridges, but is also applicable to some kinds of breech-loading fire-arms which are similarly loaded.

It consists of a lever attached by a fulcrum-pin to the frame of the fire-arm, and so constructed and arranged that by a suitable movement a portion of it is made to enter an opening in the chamber or chambers and between the breech and the rear end of the cartridge-shell, and so push forward the shell.

It also consists in so beveling the bottom of the chamber of the fire-arm as to provide for the entrance of the lever between it and the bottom or rear end of the cartridge.

I will proceed to describe the application of my invention to the revolver, which will enable others skilled in the art to apply it also to breech-loading fire-arms, as the manner of its application to the latter will be essentially the same.

A is the frame of the arm.

B is the cylinder, having its rear end or breech solid or constructed with shoulders or suitable bearings for the support of the rear ends of the cartridges at the bottoms of the chambers *a a*, and openings *b b* in the sides, which permit the hammer to strike upon the cartridges, and also provide for the entrance of the point of the ejector, the said openings extending backward to the rear of the chambers, and being beveled, as shown at *c c* in Fig. 2, for the entrance of the said point between the rear ends of the cartridge-shells D D and the rear of the chambers.

C is the cartridge-shell ejector, consisting of a curved lever, which is secured by its fulcrum-pin *d* in a mortise, *f*, in the side of the frame behind the cylinder, and which is constructed with a pointed or sharp-ended projection, *h*.

The frame is made with a protuberance, *e*, for the reception of the fulcrum end of the lever, the said protuberance having a part of the mortise *f* within it, and being formed to receive the projection *h* of the lever when the latter is thrown back, as shown in Fig. 2, and in black outline in Fig. 2, as it is when not in use. When it is desired to eject the exploded cartridge-shells the hammer is brought to half-cock, to permit the cylinder to be turned by hand, and the cylinder is then turned to bring one of the chambers *a a* opposite to the groove *g*, which is provided in the front part of the frame A on the same side of ejector, the said chamber being then also opposite or in line with the ejector. The ejector is then moved forward to the position shown in red outline, by which means the point or sharp end of its projection *h* is caused to enter the hole *b* between the cartridge-shell and the rear end or shoulder of the chamber, and as this movement is continued the projection *h*, entering farther into the chambers, is thereby caused to move the cartridge-shell forward. If the chambers and cartridge-shell are made slightly taper, a sudden forward movement of the ejector will throw the shell completely out of the chamber; otherwise, after being started forward, the shell may be pulled out by taking hold of its front end with the thumb and finger. When one shell has been ejected or taken out the lever is moved back a little way, and the cylinder turned to bring another chamber opposite to or in line with it, and the operation is repeated. The several chambers are brought one after another to the above-mentioned position, and the opertion of the ejector each time repeated until all the shells have been extracted.

The ejector may be used in the same way to unload any of the chambers which have not been fired.

What I claim as my invention, and desire to secure by Letters Patent, is—

1. A cartridge-shell ejector consisting of a lever attached to frame of the fire-arm, and so constructed and arranged that by a suitable movement a portion of it is made to enter an opening in the chamber or chambers between the breech or rear end thereof and the bottom of the cartridge-shell, substantially as and for the purpose herein described.

2. So beveling the bottom of the chamber of the fire-arm as to provide for the entrance of the lever between it and the rear end of the cartridge-shell, substantially as herein described.

HENRY REYNOLDS.

Witnesses:
SAML. GRISWOLD,
E. H. PLANT.